(12) United States Patent
Reznik et al.

(10) Patent No.: US 7,136,369 B2
(45) Date of Patent: Nov. 14, 2006

(54) MULTIUSER DETECTOR FOR VARIABLE SPREADING FACTORS

(75) Inventors: Alexander Reznik, Princeton, NJ (US); Timothy J. Lubecki, Westfield, NJ (US); Ariela Zeira, Huntington, NY (US)

(73) Assignee: InterDigtal Rechnology Corporation, Wilmington, DE (US)

( * ) Notice: Subject to any disclaimer, the term of this patent is extended or adjusted under 35 U.S.C. 154(b) by 962 days.

(21) Appl. No.: 10/100,997

(22) Filed: Mar. 19, 2002

(65) Prior Publication Data

US 2002/0176392 A1    Nov. 28, 2002

Related U.S. Application Data

(63) Continuation of application No. PCT/US00/02621, filed on Feb. 2, 2000.

(60) Provisional application No. 60/154,985, filed on Sep. 21, 1999.

(51) Int. Cl.
*H04B 7/216* (2006.01)
(52) U.S. Cl. .............. 370/342; 370/441; 375/140
(58) Field of Classification Search ............. 370/208, 370/209, 342, 335, 441; 375/148, 141, 130, 375/143, 144, 140
See application file for complete search history.

(56) References Cited

U.S. PATENT DOCUMENTS 6,775,260 B1 *   8/2004   Dabak et al. .............. 370/342

2003/0043893 A1   3/2003   Jard et al. .................. 375/152

OTHER PUBLICATIONS

A. Klein et al., "Zero Forcing and Minimum Mean-Square-Error Equalization for Multiuser Detection in Code-Division Multiple-Access Channels," IEEE Transactions on Vehicular Technology, US, IEEE Inc. New York, vol. 45, No. 2, May 1, 1996 pp. 276-287.
H. R. Karimi et al., "A Novel and Efficient Solution to Block-Based Joint-Detection Using Approximate Cholesky Factorization," IEEE International Symposium on Personal, Indoor and Mobile Radio Communications, vol. 3, 1998, pp. 1340-1345.
J. Mayer et al., "Realtime Feasibility of Joint Detection CDMA," EPMCC, European Personal Mobile Communications Conference Together with Kommunikation, vol. 145, No. 145, 1997, pp. 245-25.
M. Vollmer et al., "Comparative Study of Joint-Detection Techniques for TD-CDMA Based Mobile Radio Systems," IEEE Journal On Selected Areas In Communications, vol. 19, No. 8, Aug. 2001, pp. 1461-1475.

* cited by examiner

*Primary Examiner*—John Pezzlo
(74) *Attorney, Agent, or Firm*—Volpe and Koenig, P.C.

(57) ABSTRACT

A multiuser detector that detects and decodes synchronous or asynchronous CDMA subchannels having different spreading factors with reduced computational complexity. The multiuser detector is compatible with ZF-BLE, MMSE, decorrelating detectors and the like using Cholesky decomposition to minimize numeric operations. The system and method arranges the columns of system transmission response matrices representing the response characteristics of individual users into a total system transmission response matrix which represents a plurality of matched-filter responses for a given block of received data. The invention in conjunction with Cholesky decomposition reduces the number of required mathematic operations prior to parallel matched filtering.

48 Claims, 11 Drawing Sheets

US 7,136,369 B2

MULTIUSER DETECTOR FOR VARIABLE SPREADING FACTORS

This application is a continuation of international application No. PCT/US00/02621, filed Feb. 2, 2000, which claims priority to U.S. Provisional Patent Application No. 60/154,985, filed Sep. 21, 1999.

BACKGROUND

1. Field of the Invention

The present invention relates generally to multiple access digital communication systems. More specifically, the invention relates to a multiuser detector system and method for the simultaneous reception of data from multiple users having different spreading factors.

2. Description of the Related Art

A multiple-access communication system allows a plurality of users to access the same communication medium to transmit or receive information. The media may comprise, for example, a network cable in a local area network or lan, a copper wire in the classic telephone system, or an air interface for wireless communication.

A prior art multiple access communication system is shown in FIG. 1. The communication media is referred to as a communication channel. Communication techniques such as frequency division multiple access or FDMA, time division multiple access or TDMA, carrier sense multiple access or CSMA, code division multiple access or CDMA and others allow access to the same communication medium for more than one user. These techniques can be mixed together creating hybrid varieties of multiple access schemes. For example, time division duplex or TDD mode of the proposed third generation W-CDMA standard is a combination of TDMA and CDMA.

An example CDMA prior art communication system is shown in FIG. 2. CDMA is a communication technique in which data is transmitted with a broadened band (spread spectrum) by modulating the data to be transmitted with a pseudo-noise signal. The data signal to be transmitted may have a bandwidth of only a few thousand Hertz distributed over a frequency band that may be several million Hertz. The communication channel is being used simultaneously by K independent subchannels. For each subchannel, all other subchannels appear as interference.

As shown, a single subchannel of a given bandwidth is mixed with a unique spreading code which repeats a predetermined pattern generated by a wide bandwidth, pseudo-noise (pn) sequence generator. These unique user spreading codes are typically pseudo-orthogonal to one another such that the cross-correlation between the spreading codes is close to zero. A data signal is modulated with the pn sequence producing a digital spread spectrum signal. A carrier signal is then modulated with the digital spread spectrum signal and transmitted in dependence upon the transmission medium. A receiver demodulates the transmission extracting the digital spread spectrum signal. The transmitted data is reproduced after correlation with the matching pn sequence. When the spreading codes are orthogonal to one another, the received signal can be correlated with a particular user signal related to the particular spreading code such that only the desired user signal related to the particular spreading code is enhanced while the other signals for all other users are not enhanced.

Each value of the spreading code is known as a chip and has a chip rate that is the same or faster than the data rate. The ratio between the chip rate and the subchannel data rate is the spreading factor.

To extend the possible range of values of the data signal, a symbol is used to represent more than two binary values. Ternary and quaternary symbols take on three and four values respectively. The concept of a symbol allows for a greater degree of information since the bit content of each symbol dictates a unique pulse shape. Depending upon the number of symbols used, an equal number of unique pulse or wave shapes exist. The information at the source is converted into symbols which are modulated and transmitted through the subchannel for demodulation at the destination.

The spreading codes in a CDMA system are chosen to minimize interference between a desired subchannel and all other subchannels. Therefore, the standard approach to demodulating the desired subchannel has been to treat all other subchannels as interference, similar to interference that manifests itself in the communication medium. Receivers designed for this process are single-user, matched filter and RAKE receivers.

Since different subchannels do interfere with each other somewhat, another approach is to demodulate all subchannels at a receiver. The receiver can listen to all of the users transmitting at once by running a decoding algorithm for each of them in parallel. This ideology is known as multiuser detection. Multiuser detection can provide a significant performance improvement over single-user receivers.

Referring to FIG. 3, a system block diagram of a prior art CDMA receiver using a multiuser detector is shown. As one skilled in this art realizes, the receiver may include such functions as radio frequency or rf down conversion and associated filtering for radio frequency channels, analog-to-digital conversion or optical signal demodulation for a specific communication media. The output of the receiver is a processed signal, either analog or digital, containing the combined spread signals of all active subchannels. The multiuser detector performs multiuser detection and outputs a plurality of signals corresponding to each active subchannel. All or a smaller number of the total number of subchannels may be processed.

Optimal multiuser detectors are computationally intensive devices performing numerous complex mathematic operations and are therefore difficult to implement economically. To minimize expense, suboptimal multiuser detectors such as linear detectors have been developed requiring less computational complexity as a compromise approximating the performance of optimal detectors. Linear detectors include decorrelators, minimum mean square error or MMSE detectors, and zero-forcing block linear equalizers or ZF-BLEs.

A system block diagram of a prior art linear multiuser detector for synchronous or asynchronous CDMA communication is shown in FIG. 4. Data output from the communication media specific receiver (as in FIG. 3) is coupled to a subchannel estimator which estimates the impulse response of each symbol transmitted in a respective subchannel. The linear detector uses the impulse response estimates along with a subchannel's spreading code to demodulate each subchannel's data. The data is output to subchannel data processing blocks for respective users.

To effect parallel detection of K subchannel users in a physical system, linear multiuser detector methods are executed as fixed gate arrays, microprocessors, digital signal processors or DSPs and the like. Fixed logic systems allow for greater system speed while microprocessor driven systems offer programming flexibility. Either implementation that is responsible for the multiuser detection performs a sequence of mathematic operations. To describe the functions, the following variables typically define the structure and operation of a linear multiuser detector:

K=the total number of users/transmitters that are active in the system.

$NC_C$=the number of chips in a data block. The number of chips is required since with varying spreading factors this number is a measure common to all users. The number of chips is divisible by the largest spreading factor allowed. For the case of synchronous CDMA, a symbol from the user with the largest spreading factor may constitute a block of data. Therefore, $N_C$ can be reduced to be equal to the largest spreading factor.

W=the communication channel impulse response length in chips. This is generally a predefined parameter of the system.

$Q^{(k)}$=the spreading factor of user k. The spreading factor is equal to the number of chips that are used to spread a symbol of user's data. A system knows the spreading factors in advance and does not need to estimate them from the received data.

$N_S^{(k)}$=the number of symbols sent by user k. $N_S^{(k)}=N_C/Q^{(k)}$.

$$N_s^T = \sum_{k=1}^{K} N_s^{(k)} = \text{the total number of symbols sent.}$$

$d^{(k)}$=the data (information) sent by user k. The data is presented in the form of a vector, where a vector is an array of data indexed by a single index variable. For the purposes of vector and matrix operations which follow, all vectors are defined as column vectors. The $n^{th}$ element of $d^{(k)}$ is the $n^{th}$ symbol transmitted by the $k^{th}$ user.

$h^{(k)}$=the impulse response of the subchannel experienced by user k presented as a vector. This quantity needs to be estimated at the receiver. The receiver's estimates of the subchannel impulse responses are referred to as $h^{(k)}$. The elements of the vector $h^{(k)}$ are typically complex numbers, which model both amplitude and phase variations that can be introduced by the subchannel.

$v^{(k)}$=the spreading code of user k, presented as a vector. For the purposes of linear multiuser detection, it is useful to think of vectors containing the section of the spreading code which spreads a particular symbol. Therefore, the vector $v^{(k,n)}$ is defined as the spreading code which is used to spread the $n^{th}$ symbol sent by the $k^{th}$ user. Mathematically, it is defined as: $v_i^{(k,n)}=v_i^{(k)}$ for $(n-1)Q^{(k)}+1 \leq I \leq nQ^{(k)}$ and 0 for all other I, where I is the index of vector elements.

$r^{(k)}$=a vector which represents user k's data, spread by the spreading sequence $v^{(k)}$ and transmitted through that user's subchannel $h^{(k)}$. The vector $r^{(k)}$ represents channel observations performed during the period of time when a block of data arrives. The $i^{th}$ element of the vector $r^{(k)}$ can be defined as:

$$r_i^{(k)} = \sum_{n=1}^{N_s^{(k)}} d_n^{(k)} \sum_{j=1}^{W} h_j^{(k)} v_{i-j+1}^{(k,n)}. \quad \text{Equation 1}$$

The signal received at the receiver includes all user signals $r^{(k)}$ plus noise. Therefore, we can define the received data vector r as follows:

$$r = \sum_{k=1}^{K} r^{(k)} + n. \quad \text{Equation 2}$$

The vector n in Equation 2 represents noise introduced by the communication channel.

FIG. 5 shows a system and method of a prior art linear multiuser detector. The estimated subchannel impulse response vectors $h^{(k)}$ and the spreading codes $v^{(k)}$ are used to create a system transmission response matrix for each user k. A matrix is a block of numbers indexed by two indexing variables and is arranged as a rectangular grid, with the first indexing variable being a row index and the second indexing variable being a column index.

A system transmission response matrix for user k is typically denoted as $A^{(k)}$. The $i^{th}$-row, $n^{th}$-column element is denoted as $A_{i,n}^{(k)}$ and is defined as:

$$A_{i,n}^{(k)} = \sum_{j=1}^{W} h_j^{(k)} v_{i-j+1}^{(k,n)} \quad \text{Equation 3}$$

Each column of the matrix $A^{(k)}$ corresponds to a matched filter response for a particular symbol sent by user k during the period of interest. Referring back to FIG. 5, the received data r is matched to a combination of all user's spreading codes and subchannel impulse responses. Therefore, $A^{(k)}$ contains $N_s^{(k)}$ matched filter responses. The columns of $A^{(k)}$ are of the form $$A_n^{(k)} = \begin{bmatrix} 0 \\ \vdots \\ 0 \\ b_n^{(k)} \\ 0 \\ \vdots \\ 0 \end{bmatrix} \quad \text{Equation 4}$$

where each vector $b_n^{(k)}$ has a dimension of $Q^{(k)}+W-1$,      Equation 5 and is offset from the top of the matrix $A_n^{(k)}$ by $Q^{(k)}(n-1)$.      Equation 6

Since the spreading codes are not periodic over symbol times; $b_i^{(k)} \neq b_j^{(k)}$ for $I \neq j$. The elements of a vector which may be non-zero values are referred to as the support of the vector. Therefore, $b_n^{(k)}$ is the support of $A_n^{(k)}$.

Once a system transmission matrix for each user is created, a total system transmission response matrix, denoted as A is created by concatenating the system transmission matrices for all the users as shown below:

$$A=[A^{(1)}, \ldots, A^{(k)}, \ldots, A^{(K)}].$$ Equation 7

In accordance with prior art modulation techniques, the elements of $h^{(k)}$ can be complex numbers. It then follows that the non-zero elements of A can be complex numbers.

An example total system transmission response matrix A for a hypothetical prior art multiuser detector assembled in accordance with Equations 4, 5, 6 and 7 is $$A = \begin{bmatrix} b_{1,1}^{(1)} & 0 & 0 & 0 & 0 & 0 & 0 & 0 & b_{1,1}^{(2)} & 0 & 0 & 0 \\ b_{1,2}^{(1)} & 0 & 0 & 0 & 0 & 0 & 0 & 0 & b_{1,2}^{(2)} & 0 & 0 & 0 \\ b_{1,3}^{(1)} & b_{2,1}^{(1)} & 0 & 0 & 0 & 0 & 0 & 0 & b_{1,3}^{(2)} & 0 & 0 & 0 \\ b_{1,4}^{(1)} & b_{2,2}^{(1)} & 0 & 0 & 0 & 0 & 0 & 0 & b_{1,4}^{(2)} & 0 & 0 & 0 \\ b_{1,5}^{(1)} & b_{2,3}^{(1)} & b_{3,1}^{(1)} & 0 & 0 & 0 & 0 & 0 & b_{1,5}^{(2)} & b_{2,1}^{(2)} & 0 & 0 \\ 0 & b_{2,4}^{(1)} & b_{3,2}^{(1)} & 0 & 0 & 0 & 0 & 0 & b_{1,6}^{(2)} & b_{2,2}^{(2)} & 0 & 0 \\ 0 & b_{2,5}^{(1)} & b_{3,3}^{(1)} & b_{4,1}^{(1)} & 0 & 0 & 0 & 0 & b_{1,7}^{(2)} & b_{2,3}^{(2)} & 0 & 0 \\ 0 & 0 & b_{3,4}^{(1)} & b_{4,2}^{(1)} & 0 & 0 & 0 & 0 & 0 & b_{2,4}^{(2)} & 0 & 0 \\ 0 & 0 & b_{3,5}^{(1)} & b_{4,3}^{(1)} & b_{5,1}^{(1)} & 0 & 0 & 0 & 0 & b_{2,5}^{(2)} & b_{3,1}^{(2)} & 0 \\ 0 & 0 & 0 & b_{4,4}^{(1)} & b_{5,2}^{(1)} & 0 & 0 & 0 & 0 & b_{2,6}^{(2)} & b_{3,2}^{(2)} & 0 \\ 0 & 0 & 0 & b_{4,5}^{(1)} & b_{5,3}^{(1)} & b_{6,1}^{(1)} & 0 & 0 & 0 & b_{2,7}^{(2)} & b_{3,3}^{(2)} & 0 \\ 0 & 0 & 0 & 0 & b_{5,4}^{(1)} & b_{6,2}^{(1)} & 0 & 0 & 0 & 0 & b_{3,4}^{(2)} & 0 \\ 0 & 0 & 0 & 0 & b_{5,5}^{(1)} & b_{6,3}^{(1)} & b_{7,1}^{(1)} & 0 & 0 & 0 & b_{3,5}^{(2)} & b_{4,1}^{(2)} \\ 0 & 0 & 0 & 0 & 0 & b_{6,4}^{(1)} & b_{7,2}^{(1)} & 0 & 0 & 0 & b_{3,6}^{(2)} & b_{4,2}^{(2)} \\ 0 & 0 & 0 & 0 & 0 & b_{6,5}^{(1)} & b_{7,3}^{(1)} & b_{8,1}^{(1)} & 0 & 0 & b_{3,7}^{(2)} & b_{4,3}^{(2)} \\ 0 & 0 & 0 & 0 & 0 & 0 & b_{7,4}^{(1)} & b_{8,2}^{(1)} & 0 & 0 & 0 & b_{4,4}^{(2)} \\ 0 & 0 & 0 & 0 & 0 & 0 & b_{7,5}^{(1)} & b_{8,3}^{(1)} & 0 & 0 & 0 & b_{4,5}^{(2)} \\ 0 & 0 & 0 & 0 & 0 & 0 & 0 & b_{8,4}^{(1)} & 0 & 0 & 0 & b_{4,6}^{(2)} \\ 0 & 0 & 0 & 0 & 0 & 0 & 0 & b_{8,5}^{(1)} & 0 & 0 & 0 & b_{4,7}^{(2)} \end{bmatrix}$$

Equation 8

$\underbrace{\phantom{xxxxxx}}_{A^{(1)}} \underbrace{\phantom{xxxxxx}}_{A^{(2)}}$ for two (k=2) users, $A^{(1)}$ and $A^{(2)}$ having sixteen chips in a data block ($N_C=16$), a channel impulse response length of four (W=4) and a spreading factor for the first user of two ($Q^{(1)}=2$) and a spreading factor for the second user of four ($Q^{(2)}=4$). In the resultant total system transmission response matrix A, $b_{n,i}^{(k)}$ denotes the $i^{th}$ element of the combined system and channel response for the $n^{th}$ symbol of the $k^{th}$ user.

The received data r is processed using the total system transmission response matrix A which represents a bank of matched filter responses to create a vector of matched-filter outputs which is denoted as y. The matched filtering operation is defined as $$y=A^H r.$$ Equation 9

The matrix $A^H$ represents the Hermitian (or complex) transpose of the matrix A. The Hermitian transpose is defined as $A_{ij}^H = \overline{A}_{ji}$ where the over-bar denotes the operation of taking a conjugate of a complex number. The matched filter outputs are then multiplied by the inverse of an objective matrix O. The objective matrix O represents the processing which differentiates each type of linear receiver model. It is derived from the system transmission matrix A.

The zero-forcing block linear equalizer (ZF-BLE) receiver is a linear receiver with an objective matrix specified as $O=A^H A$. The minimum mean square error block linear equalizer (MMSE-BLE) receiver is a linear receiver with an objective matrix specified as $O=A^H A+\sigma^2 I$ where $\sigma^2$ is the variance of the noise present on each of the symbols of the received data vector r and the matrix I is known as an identity matrix. An identity matrix is square and symmetric with 1s on its main diagonal and zeros everywhere else. The size of the identity matrix is chosen so as to make the addition operation valid according to the rules of linear algebra.

For a decorrelator (decorrelating receiver), matrix A is simplified by ignoring the channel responses $h^{(k)}$, considering only the spreading codes and their cross-correlation (interference) properties. A cross-correlation matrix, commonly referred to as R, is generally constructed for decorrelator type receivers. This matrix can be constructed by assuming that W=1 and $h_i^{(k)}=1$ in the definition of A above (i.e. the channel response of every subchannel is an impulse). Then the cross correlation matrix R is the objective matrix O as defined for the ZF-BLE receiver. A decorrelator often serves as a sub-process of a more complex multiuser detection receiver. Once the objective matrix is created, the multiuser detector will invert the matrix, denoted as $O^{-1}$.

The inverse of the objective matrix is then multiplied by the matched filter output vector y to produce estimates of the data vector d where $d(\text{estimate})=O^{-1}y$. The inversion of the objective matrix O is a complex, computationally intensive process. The number of operations required to perform this process increase as the cube of the size of the matrix O. For most asynchronous CDMA receivers, the size of O is very large which makes the process of inversion impracticable.

To overcome this limitation, and to make the system physically realizable, a numerical method due to Cholesky is used. Cholesky decomposition can significantly reduce the computational complexity of inverting the matrix O if the matrix is banded.

A banded matrix is a square matrix that contains non-zero values only on several diagonals away from the main diagonal. The number of non-zero diagonals adjacent to the main diagonal that have at least one non-zero element is referred to as bandwidth. Thus, a symmetric matrix M is said to be banded with bandwidth p if $$m_{ij}=0 \text{ for all } j>I+p, \quad \text{Equation 10}$$

where $m_{ij}$ is an element of M, with I being the row index and j the column index. For a banded matrix with size denoted as n and bandwidth denoted as p, Cholesky decomposition can reduce the required numeric operations of inverting the objective matrix O from varying as the cube of the size of the matrix, $n^3$, to varying as the size of the matrix times the square of the bandwidth, $np^2$.

As discussed above, the objective matrix for a ZF-BLE receiver is $O=A^H A$. To illustrate ate the numeric complexity, the objective matrix for the total system response shown in Equation 6 is $$O = \begin{bmatrix} x & x & x & 0 & 0 & 0 & 0 & 0 & x & x & 0 & 0 \\ x & x & x & x & 0 & 0 & 0 & 0 & x & x & 0 & 0 \\ x & x & x & x & x & 0 & 0 & 0 & x & x & x & 0 \\ 0 & x & x & x & x & x & 0 & 0 & x & x & x & 0 \\ 0 & 0 & x & x & x & x & x & 0 & 0 & x & x & x \\ 0 & 0 & 0 & x & x & x & x & x & 0 & x & x & x \\ 0 & 0 & 0 & 0 & x & x & x & x & 0 & 0 & x & x \\ 0 & 0 & 0 & 0 & 0 & x & x & x & 0 & 0 & x & x \\ x & x & x & x & 0 & 0 & 0 & 0 & x & x & 0 & 0 \\ x & x & x & x & x & 0 & x & x & x & x & x & 0 \\ 0 & 0 & x & x & x & x & x & x & 0 & x & x & x \\ 0 & 0 & 0 & 0 & x & x & x & x & 0 & 0 & x & x \end{bmatrix} \quad \text{Equation 11}$$

where zeros denote all elements that by mathematical operation yield zero and with x's representing non-zero values. If the non-zero elements of the $i^{th}$ row and $j^{th}$ column of the total system response matrix A do not have the same vector index, then the corresponding element of objective matrix O with row index I and column index j will be 0. The bandwidth of O (Equation 11) is equal to 9 since there are non-zero elements as far as nine columns away from the main diagonal.

The objective matrix O as it is constructed in the prior art receiver shown in FIG. 5 is not well banded. Therefore, Cholesky decomposition cannot be used effectively to reduce the operational complexity when inverting matrix O. However, the prior art discloses that when all users transmit with equal spreading factors, a re-arrangement of the total system transmission response matrix A can be performed prior to calculating an objective matrix O, turning matrix O into a banded matrix. A system block diagram for this process is shown in FIG. 6.

The process which computes the column re-arrangement of matrix A performs the re-arrangement without any additional information. The re-arrangement reduces the operational complexity when inverting the matrix. Once the detection procedure is complete, a user data vector d is computed, a reversed re-arrangement process is performed descrambling vector d back to its original form for further processing.

In a typical asynchronous CDMA system, the bandwidth of a re-arranged objective matrix is at least ten times less than its original size. Therefore, a savings of at least a factor of 100 in processing time is achieved when Cholesky decomposition is performed on an objective matrix based upon are-arranged total system response matrix. However, the prior art has not addressed a re-arrangement method for when different spreading factors are in use between active users.

Accordingly, there exists a need to determine a method to reduce the number of inversion steps when different spreading factors are in use.

SUMMARY

The present invention relates to a multiuser detector that detects and decodes synchronous or asynchronous CDMA subchannels having different spreading factors with reduced computational complexity. The multiuser detector of the present invention is compatible with ZF-BLE, MMSE, decorrelating detectors and the like using Cholesky decomposition to minimize numeric operations. The system and method arranges the columns of system transmission response matrices representing the response characteristics of individual users into a well-banded total system transmission response matrix which represents a plurality of matched-filter responses for a given block of received data. The invention in conjunction with Cholesky decomposition reduces the number of required mathematic operations prior to parallel matched filtering.

BRIEF DESCRIPTION OF THE DRAWING(S)

DETAILED DESCRIPTION OF THE PREFERRED EMBODIMENT(S)

Figure 1:
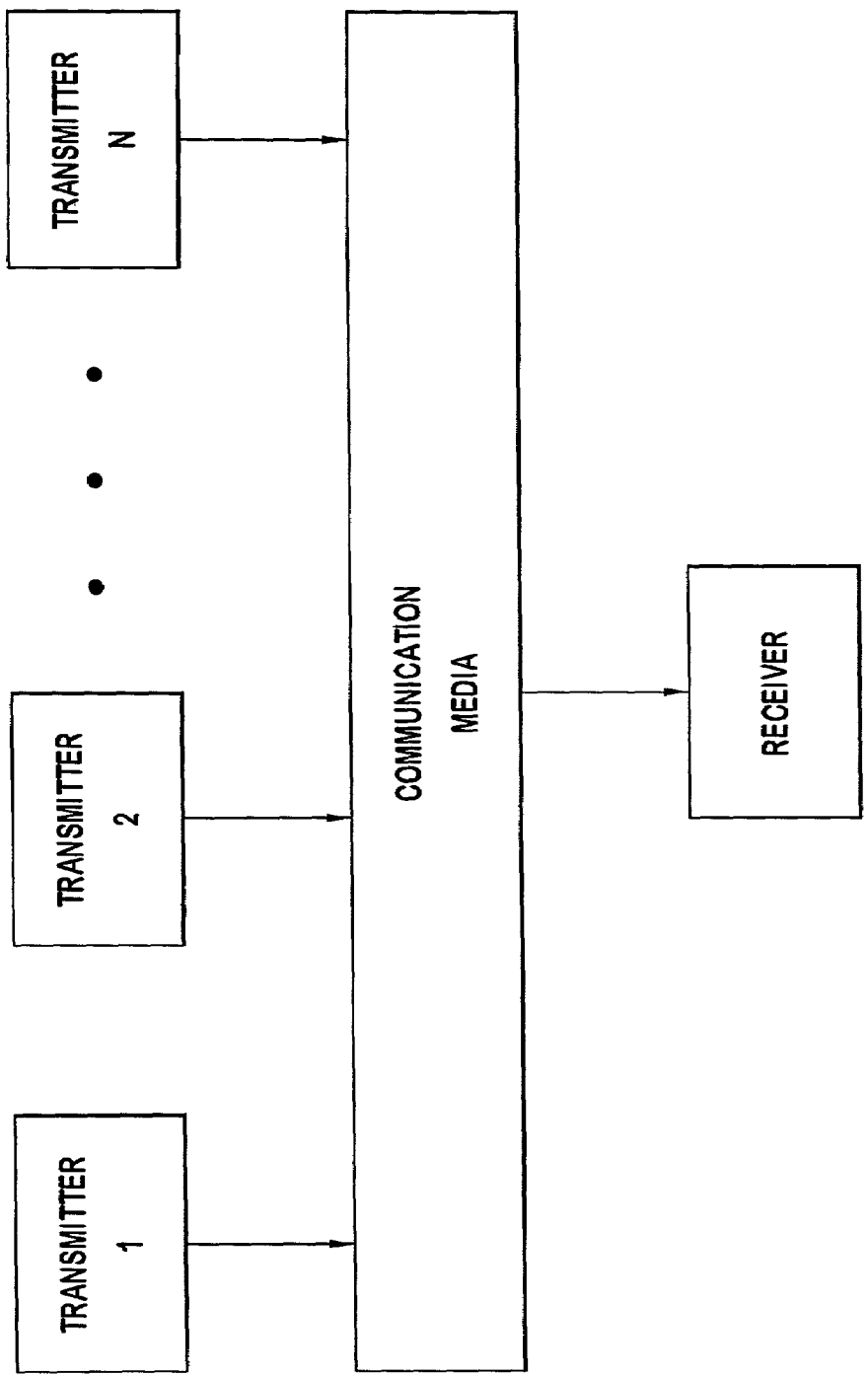
FIG. 1 is a simplified block diagram of a prior art multiple access communication system.
Figure 2:
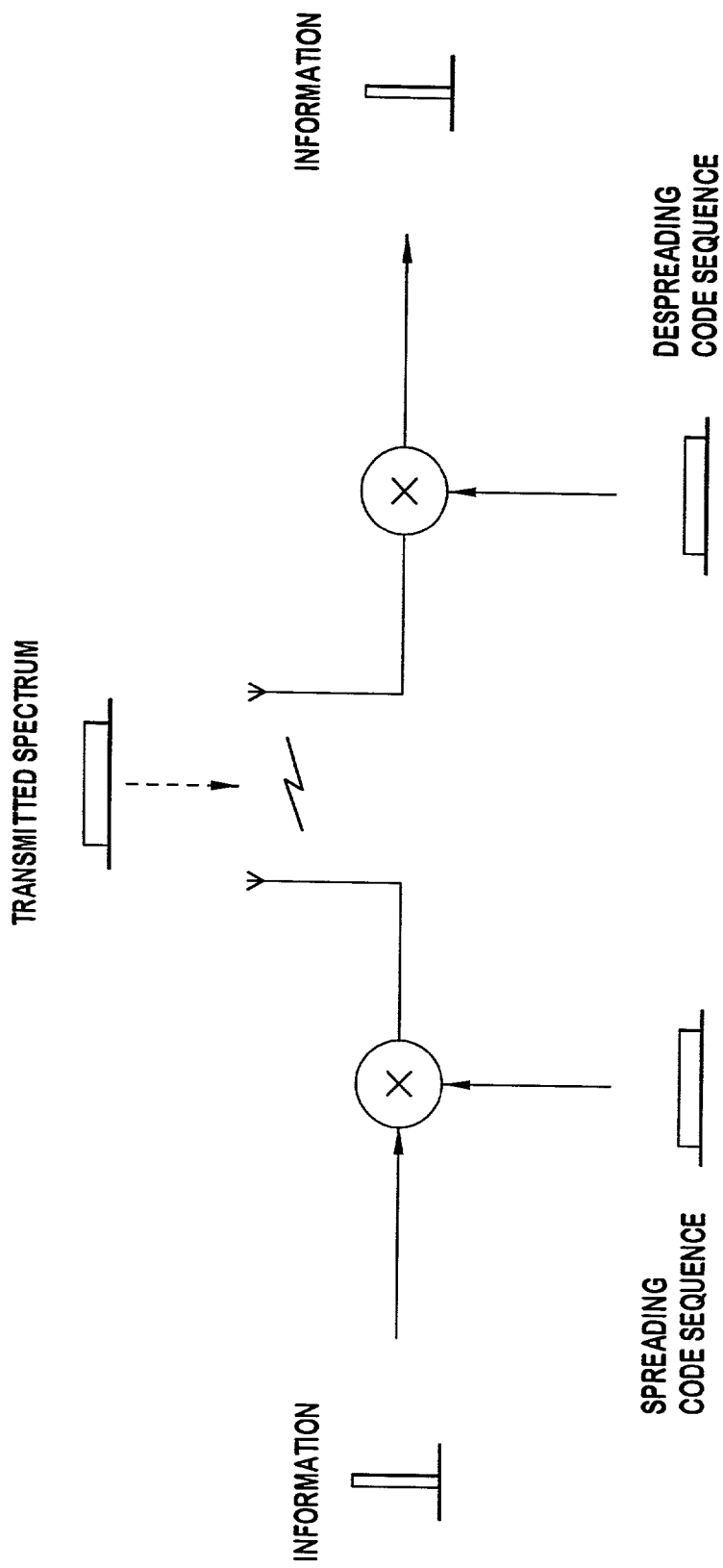
FIG. 2 is a simplified block diagram of a prior art CDMA communication system.
Figure 3:
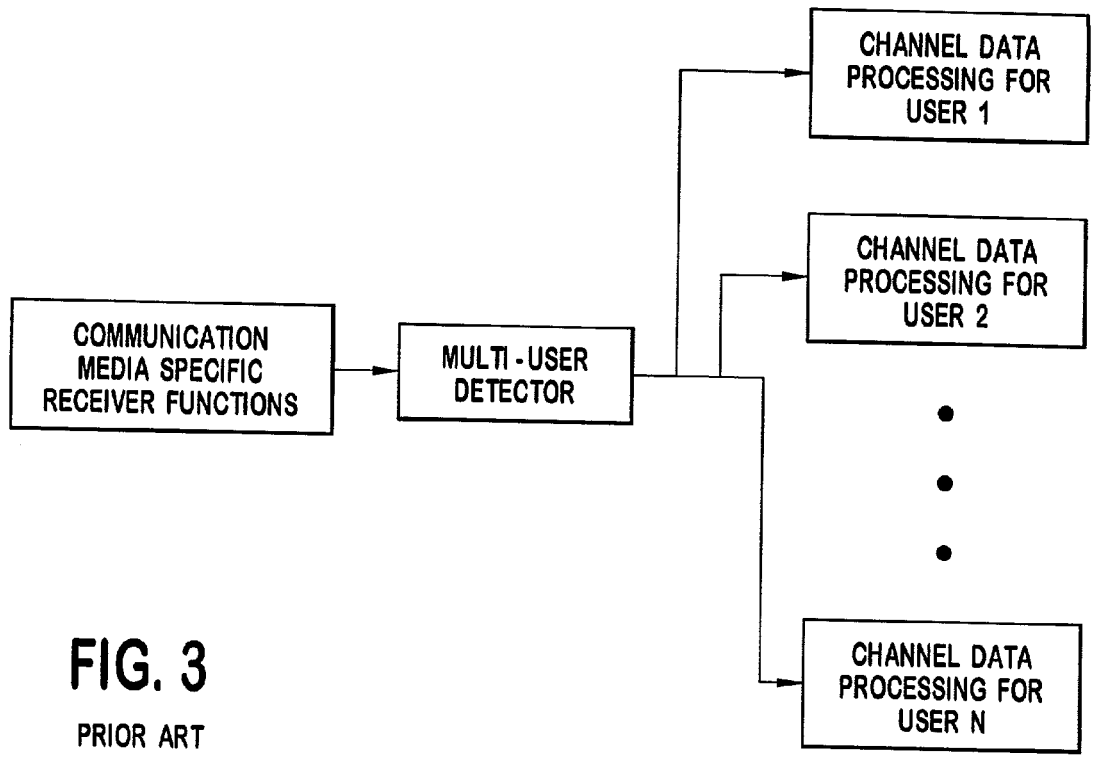
FIG. 3 is a simplified block diagram of a prior art CDMA receiver with multiuser detection.
Figure 4:
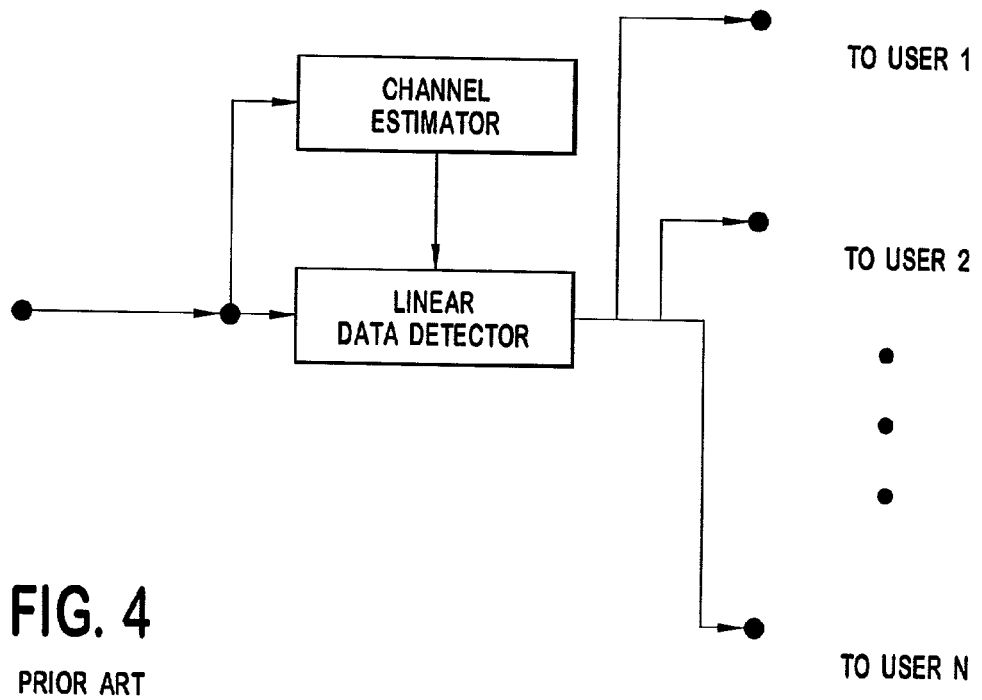
FIG. 4 is a simplified block diagram of a prior art multiuser detector.
Figure 5:
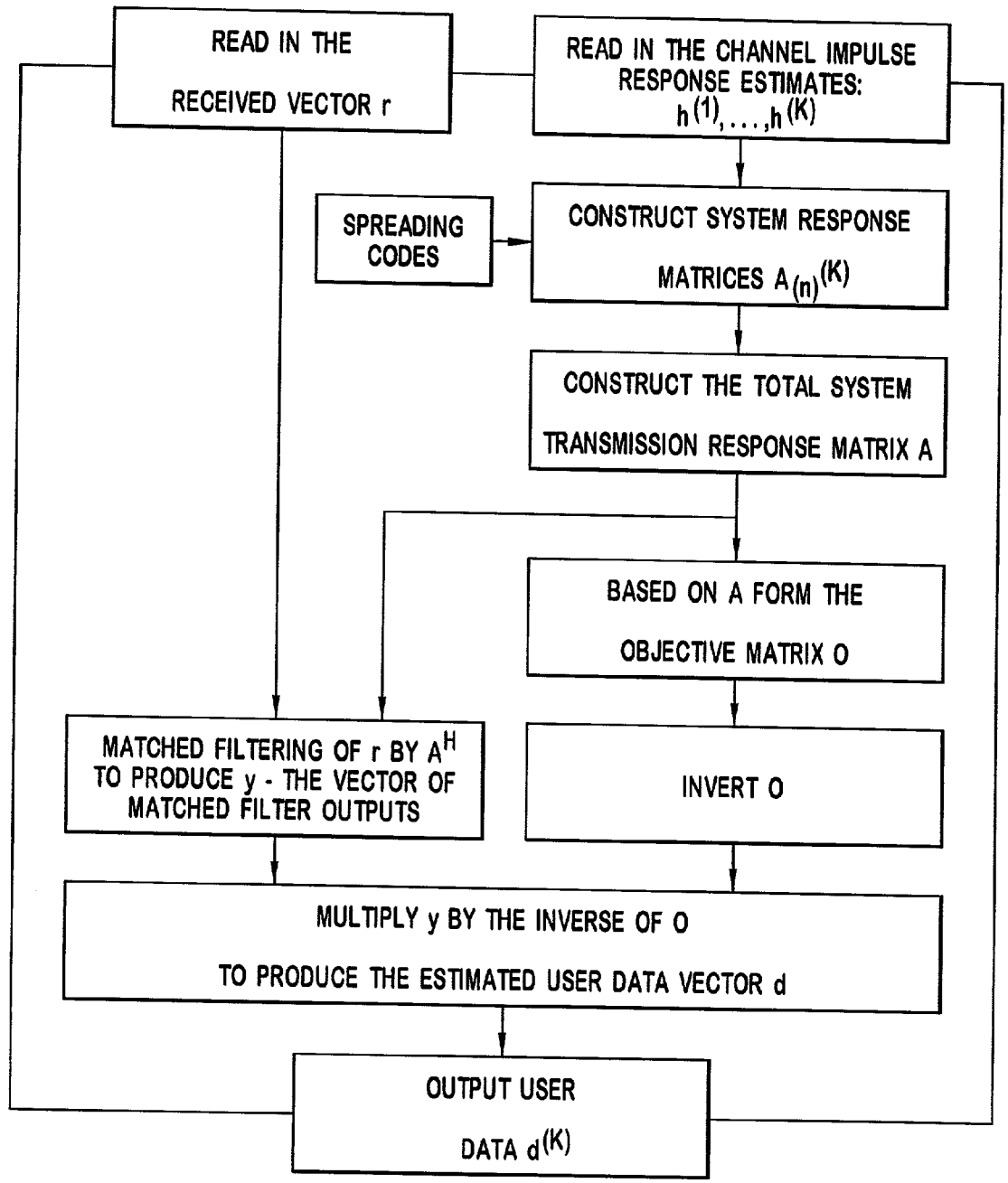
FIG. 5 is a block diagram of a prior art linear multiuser detector.
Figure 6:
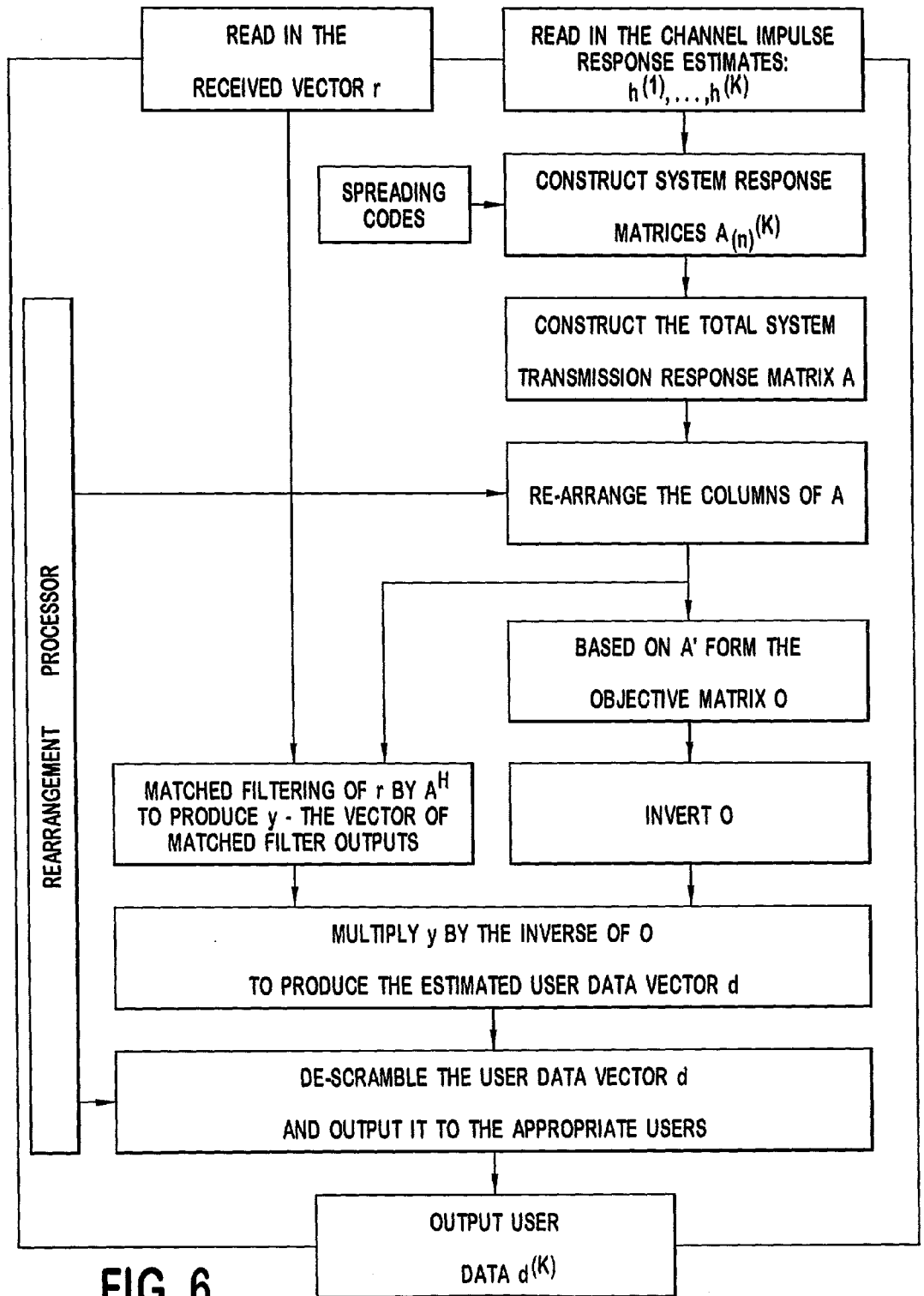
FIG. 6 is a block diagram of a prior art linear multiuser detector using Cholesky decomposition.

The embodiments will be described with reference to the drawing figures where like numerals represent like elements throughout.

Figure 7:
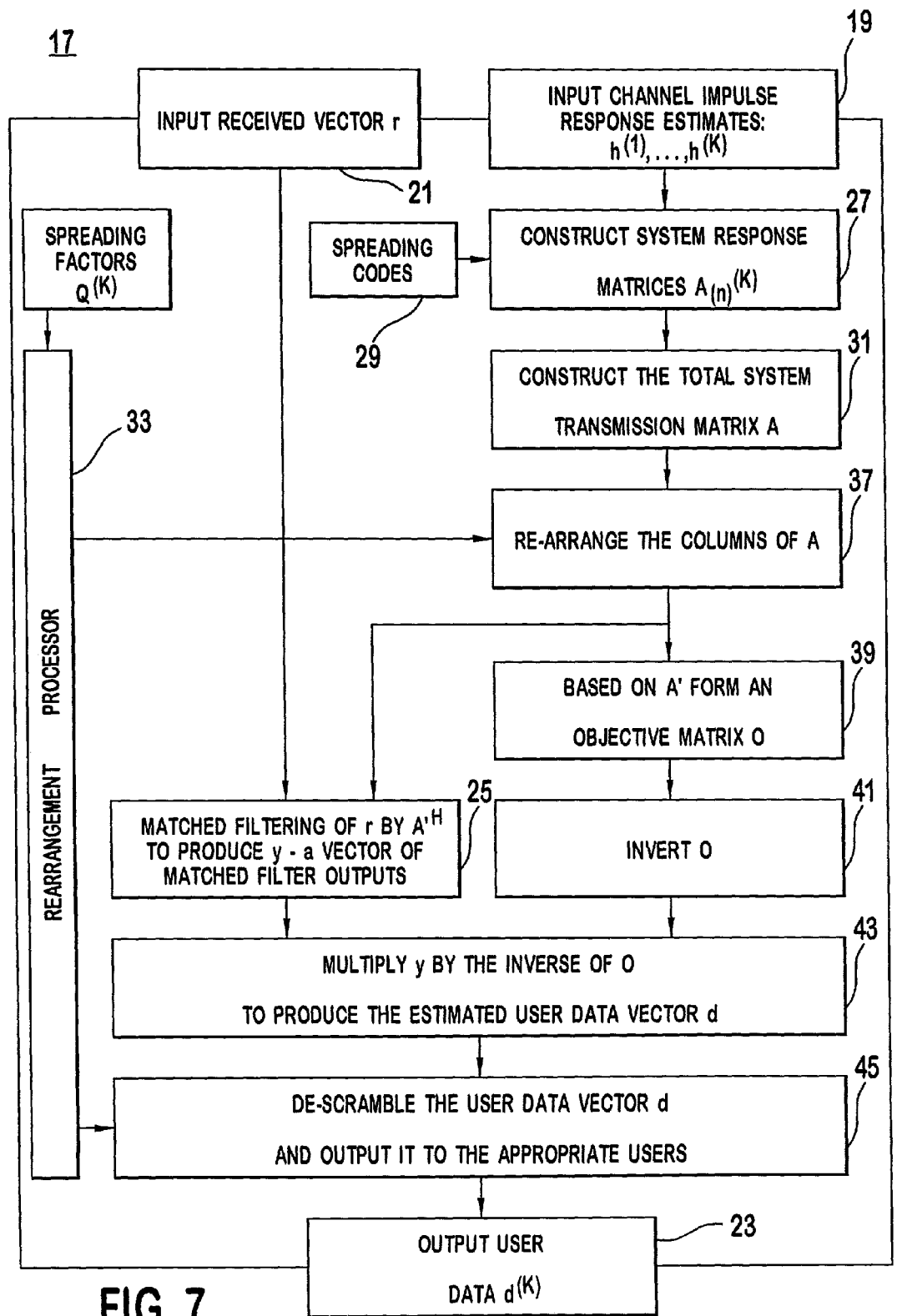
FIG. 7 is block diagram of a linear multiuser detector of the present invention.

Shown in FIG. 7 is a multiuser detector 17 of the present invention for detecting, after reception, a plurality of users transmitting over a common CDMA channel. The multiuser detector 17 comprises a plurality of processors having collateral memory which perform various vector and matrix operations. Alternate embodiments of the invention include fixed gate arrays and DSPs performing the functions of the various processors. The detector 17 also comprises a first input 19 for inputting individual k subchannel impulse response estimates modeled as vectors $h^{(k)}$ to correct intersymbol interference or ISI caused by a subchannel's own symbols and multiple access interference or MAI caused by symbols from other user's subchannels for all received data signals, a second input 21 for inputting data from all users k transmitted in a discreet block of time in the form of an input vector r containing the combined data from each user's subchannel and an output 23 for outputting user data $d^{(k)}$ for each user k from the received channel data r in the form of an output vector. The total number of users K and the spreading factor $Q_{(k)}$ 41 for each user (k=1, 2, 3 ... K) are known a priori.

To obtain user data $d^{(k)}$ for a specific user from the combined user data r, the user data must be filtered using a matched filter 25 or the like. One knowledgeable in this art recognizes that a matched filter 25 requires a response characteristic which is the complex conjugate of the combination of the spread pulse shape and the user's subchannel impulse response to produce an output with a level representative of the signal prior to transmission. Signals input to the filter 25 which do not match with a given response characteristic produce a lower output.

Each individual k subchannel impulse response estimate $h^{(k)}$ is input to a first memory 27 where it is combined with the same user's spreading code 29 (Equation 3) creating a system transmission response estimate matrix $A^{(k)}$ for that user. An arrangement processor 33 of the present invention 17 performs a re-ordering of all matrix $A_n^{(k)}$ columns. The arrangement method 99 requires that each subchannel system transmission response matrix $A^{(k)}$ have the column structure defined by Equation 4 which is typical of linear receivers. If the system transmission response matrices $A^{(k)}$ are not of the form defined by Equation 4, the arrangement processor 33 first re-arranges the columns to the structure defined by Equation 4. The present invention 17 does not require that all system transmission response matrices $A^{(k)}$ be concatenated into a total system transmission response matrix A as defined by Equation 7.

Figure 8:
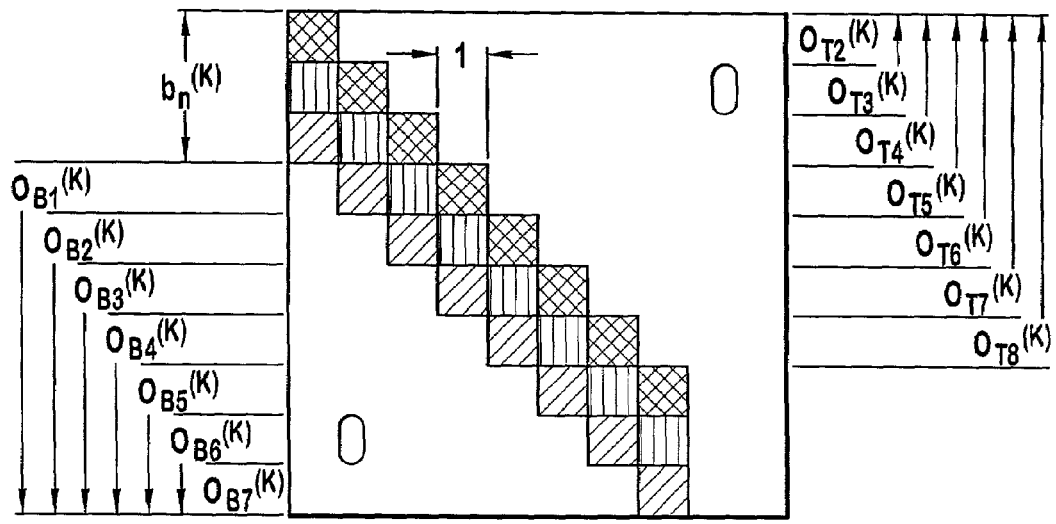
FIG. 8 depicts system transmission response matrix $A^{(k)}$ top and bottom column offsets.
Figure 9:
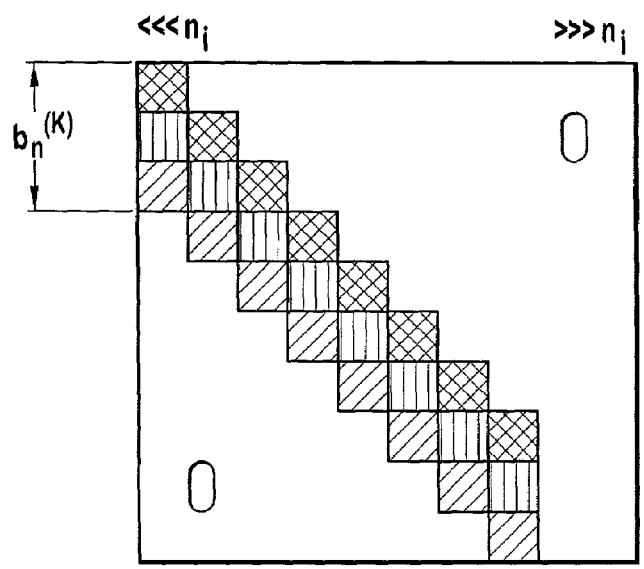
FIG. 9 depicts matrix column index value assignment.

The arrangement processor 33 examines each system transmission response matrix $A^{(1)}, A^{(2)}, A^{(3)}, \ldots A^{(k)}$ column for the number of zero-value elements from the support of each vector $b_n^{(k)}$ (Equation 4) defining top $o^{(k)}_{Tn}$ and bottom offsets $o^{(k)}_{Bn}$ as shown in FIG. 8 (for one matrix). As previously described, each system transmission response matrix $A^{(k)}$ has the same number of rows; only the number of columns vary. As shown in FIG. 9, the arrangement processor 33 assigns an index value $n_i$ for each column of each system transmission response matrices $A^{(k)}$ based upon their respective top $o^{(k)}_{Tn}$ and bottom $o^{(k)}_{Bn}$ offsets. The column values are assigned in the order of increasing magnitude from columns having minimal top offset with maximum bottom offset to columns having maximum top offset with minimal bottom offset.

If two columns are encountered where one has a greater top offset and a greater bottom offset than another, if the difference between top offsets is greater than the difference between bottom offsets, the column with the lower top offset is assigned the lower index $n_i$. If the difference between bottom offsets is greater than the difference between top offsets, All the column with the greater bottom offset is assigned the lower index $n_i$. If the differences between top and bottom offsets are equal, either of the two columns can be assigned the lower index $n_i$.

The arrangement processor 33 assembles a total system transmission response matrix A' in the order of the assigned column indices $n_i$. The column indices $n_i$ are retained in memory 33 for use during the descrambling process 45. As an example, using the total system response matrices $A^{(1)}$ and $A^{(2)}$ described and shown in Equation 8, the arrangement method 99 of the present invention 17 produces the total system transmission response matrix A shown below $$A' = \begin{bmatrix} b^{(1)}_{1,1} & b^{(2)}_{1,1} & 0 & 0 & 0 & 0 & 0 & 0 & 0 & 0 & 0 & 0 \\ b^{(1)}_{1,2} & b^{(2)}_{1,2} & 0 & 0 & 0 & 0 & 0 & 0 & 0 & 0 & 0 & 0 \\ b^{(1)}_{1,3} & b^{(2)}_{1,3} & b^{(1)}_{2,1} & 0 & 0 & 0 & 0 & 0 & 0 & 0 & 0 & 0 \\ b^{(1)}_{1,4} & b^{(2)}_{1,4} & b^{(1)}_{2,2} & 0 & 0 & 0 & 0 & 0 & 0 & 0 & 0 & 0 \\ b^{(1)}_{1,5} & b^{(2)}_{1,5} & b^{(1)}_{2,3} & b^{(1)}_{3,1} & b^{(2)}_{2,1} & 0 & 0 & 0 & 0 & 0 & 0 & 0 \\ 0 & b^{(2)}_{1,6} & b^{(1)}_{2,4} & b^{(1)}_{3,2} & b^{(2)}_{2,2} & 0 & 0 & 0 & 0 & 0 & 0 & 0 \\ 0 & b^{(2)}_{1,7} & b^{(1)}_{2,5} & b^{(1)}_{3,3} & b^{(2)}_{2,3} & b^{(1)}_{4,1} & 0 & 0 & 0 & 0 & 0 & 0 \\ 0 & 0 & 0 & b^{(1)}_{3,4} & b^{(2)}_{2,4} & b^{(1)}_{4,2} & 0 & 0 & 0 & 0 & 0 & 0 \\ 0 & 0 & 0 & b^{(1)}_{3,5} & b^{(2)}_{2,5} & b^{(1)}_{4,3} & b^{(1)}_{5,1} & b^{(2)}_{3,1} & 0 & 0 & 0 & 0 \\ 0 & 0 & 0 & 0 & b^{(2)}_{2,6} & b^{(1)}_{4,4} & b^{(1)}_{5,2} & b^{(2)}_{3,2} & 0 & 0 & 0 & 0 \\ 0 & 0 & 0 & 0 & b^{(2)}_{2,7} & b^{(1)}_{4,5} & b^{(1)}_{5,3} & b^{(2)}_{3,3} & b^{(1)}_{6,1} & 0 & 0 & 0 \\ 0 & 0 & 0 & 0 & 0 & 0 & b^{(1)}_{5,4} & b^{(2)}_{3,4} & b^{(1)}_{6,2} & 0 & 0 & 0 \\ 0 & 0 & 0 & 0 & 0 & 0 & b^{(1)}_{5,5} & b^{(2)}_{3,5} & b^{(1)}_{6,3} & b^{(1)}_{7,1} & b^{(2)}_{4,1} & 0 \\ 0 & 0 & 0 & 0 & 0 & 0 & 0 & b^{(2)}_{3,6} & b^{(1)}_{6,4} & b^{(1)}_{7,2} & b^{(2)}_{4,2} & 0 \\ 0 & 0 & 0 & 0 & 0 & 0 & 0 & b^{(2)}_{3,7} & b^{(1)}_{6,5} & b^{(1)}_{7,3} & b^{(2)}_{4,3} & b^{(1)}_{8,1} \\ 0 & 0 & 0 & 0 & 0 & 0 & 0 & 0 & b^{(1)}_{7,4} & b^{(2)}_{4,4} & b^{(1)}_{8,2} \\ 0 & 0 & 0 & 0 & 0 & 0 & 0 & 0 & b^{(1)}_{7,5} & b^{(2)}_{4,5} & b^{(1)}_{8,3} \\ 0 & 0 & 0 & 0 & 0 & 0 & 0 & 0 & 0 & b^{(2)}_{4,6} & b^{(1)}_{8,4} \\ 0 & 0 & 0 & 0 & 0 & 0 & 0 & 0 & 0 & b^{(2)}_{4,7} & b^{(1)}_{8,5} \end{bmatrix} \quad \text{Equation 12}$$

The arrangement method 99 indexed the eight columns (1–8) of system transmission response matrix $A^{(1)}$ and the four columns (9–12) of system transmission response matrix $A^{(2)}$ in an order of 1, 9, 2, 3, 10, 4, 5, 11, 6, 7, 12, 8 to create a well-banded total system transmission response matrix A (Equation 12).

The arrangement method 99 embodiment described above involves an examination of each system transmission response matrix $A^{(1)}$, $A^{(2)}$, $A^{(3)}$, ... $A^{(k)}$ comparing each column with every other column for top $o^{(k)}_{Tn}$ and bottom $o^{(k)}_{Bn}$ offsets. Given the special structure of each system transmission response matrix $A^{(k)}$, namely, that the columns arranged in order of increasing top offsets and decreasing bottom offsets as you progress from left to right (reference Equation 8, matrices $A^{(1)}$ and $A^{(2)}$), an alternative method 199 can be performed without having to examine each system transmission response matrix $A^{(k)}$ directly.

Figure 10A:
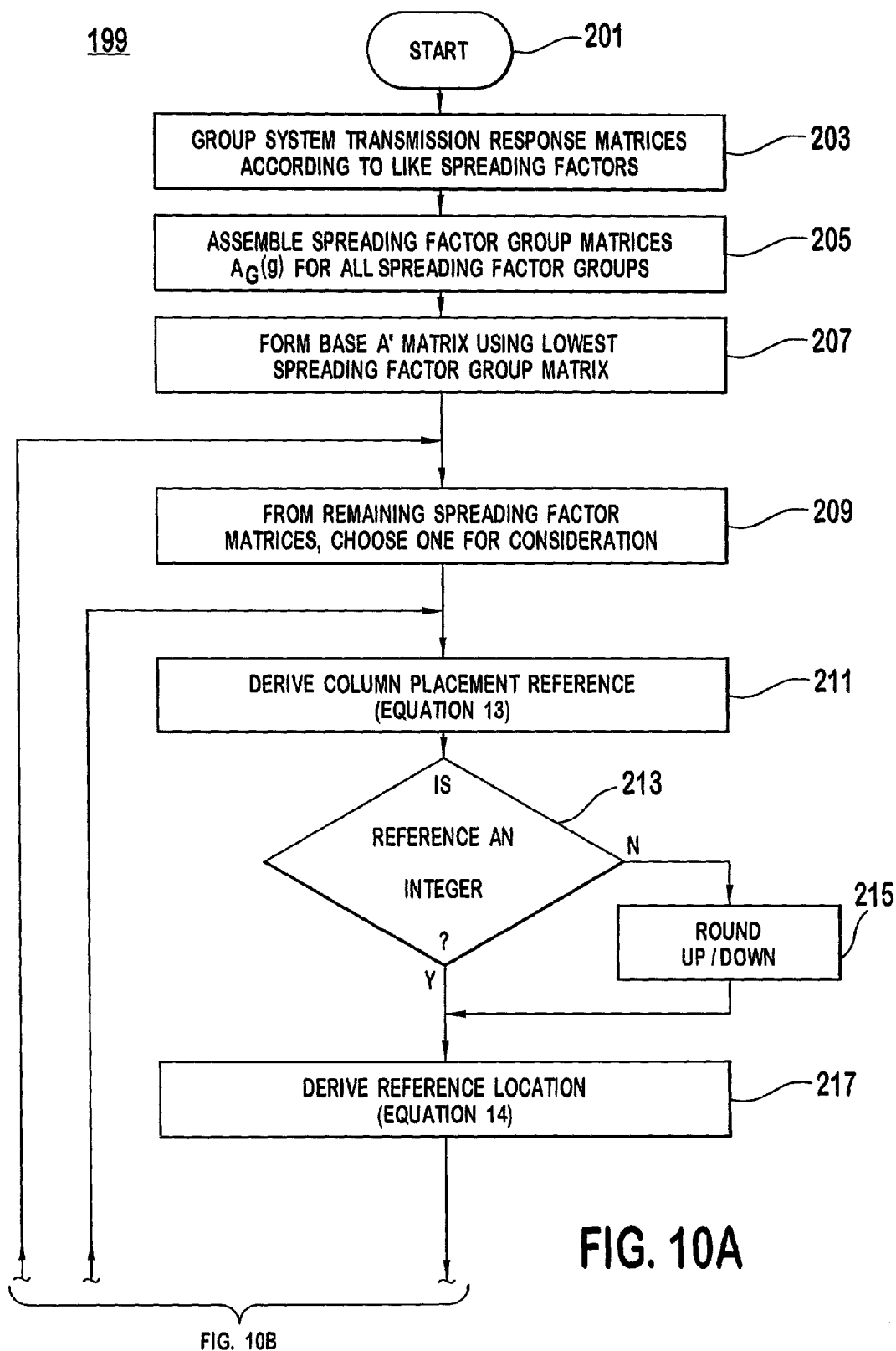
FIGS. 10A and 10B are flow diagrams of an alternative method implementing the present invention.
Figure 10B:
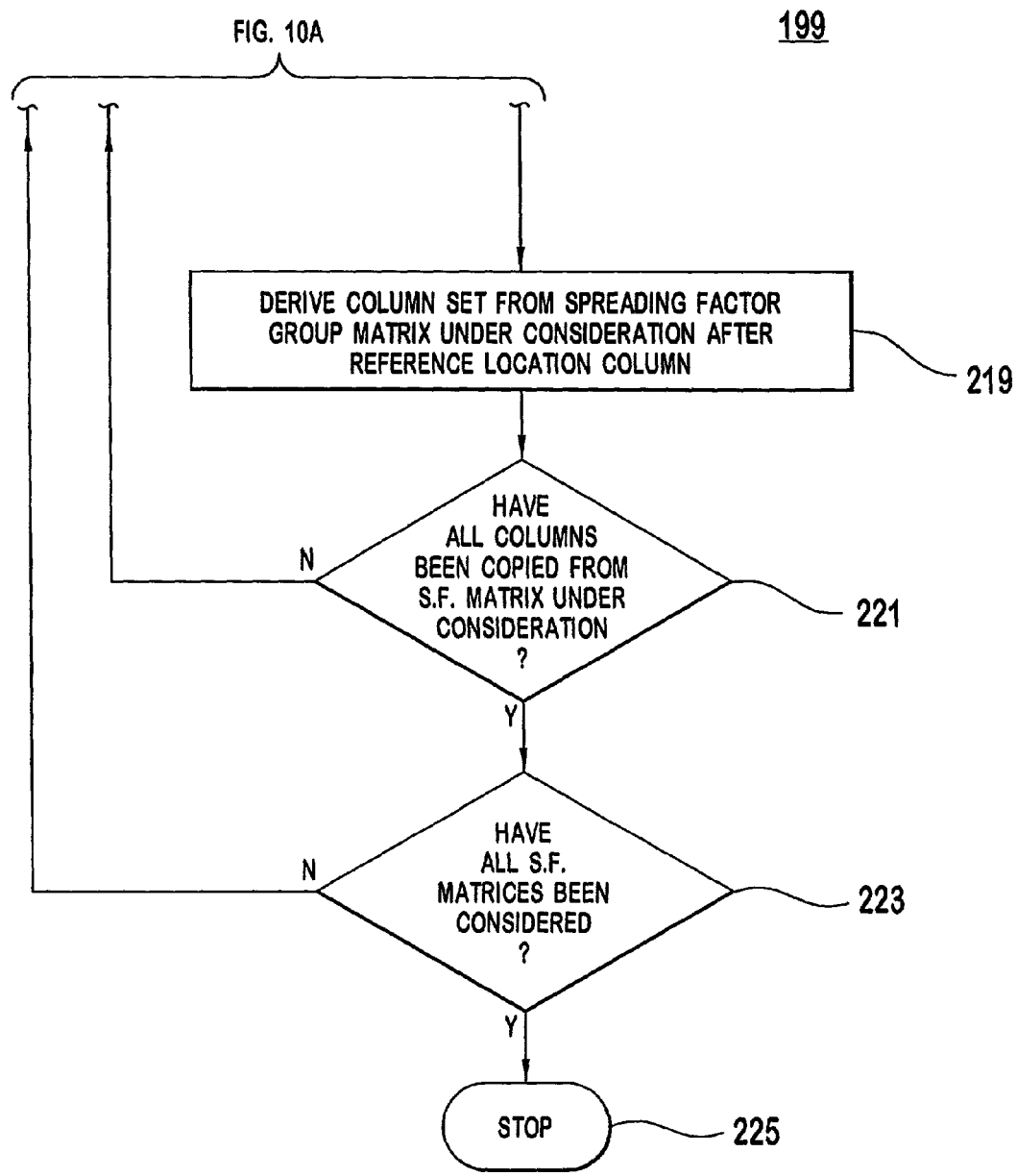

The alternative method 199 is shown in FIGS. 10A and 10B. All system transmission response matrices $A^{(k)}$ corresponding (step 201) to users having equal spreading factors are grouped together (step 203). For each spreading factor group g, memories are allocated within the processor 33 capable of storing all of the columns from all system transmission matrices $A^{(1)}$, $A^{(2)}$, $A^{(3)}$, ... $A^{(k)}$. The spreading factor groups g are arranged in order of increasing spreading factor.

An exemplary system illustrating the performance of the present invention 199 contains seven users having four different spreading factors $Q^{(k)}$ assigned as follows:

| | | |
|---|---|---|
| User 1 ($Q^{(1)}$) = 8 | User 2 ($Q^{(2)}$) = 8 | User 3 ($Q^{(3)}$) = 8 |
| User 4 ($Q^{(4)}$) = 32 | User 5 ($Q^{(5)}$) = 16 | User 6 ($Q^{(6)}$) = 16 |
| User 7 ($Q^{(7)}$) = 4. | | |

Using the system and method 199 of the present invention 17, the system transmission response matrices $A^{(k)}$ are separated into spreading factor groups:
  group 1 (spreading factor 4) $A^{(7)}$
  group 2 (spreading factor 8) $A^{(1)}$, $A^{(2)}$, $A^{(3)}$
  group 3 (spreading factor 16) $A^{(5)}$, $A^{(6)}$
  group 4 (spreading factor 32) $A^{(4)}$.

A respective spreading factor group g comprises at least one system transmission response matrix $A^{(k)}$, where each matrix $A^{(k)}$ is arbitrarily indexed from 1 to $L^{(g)}$. Each spreading factor group g is indexed according to increasing spreading factor magnitude.

Figure 11:
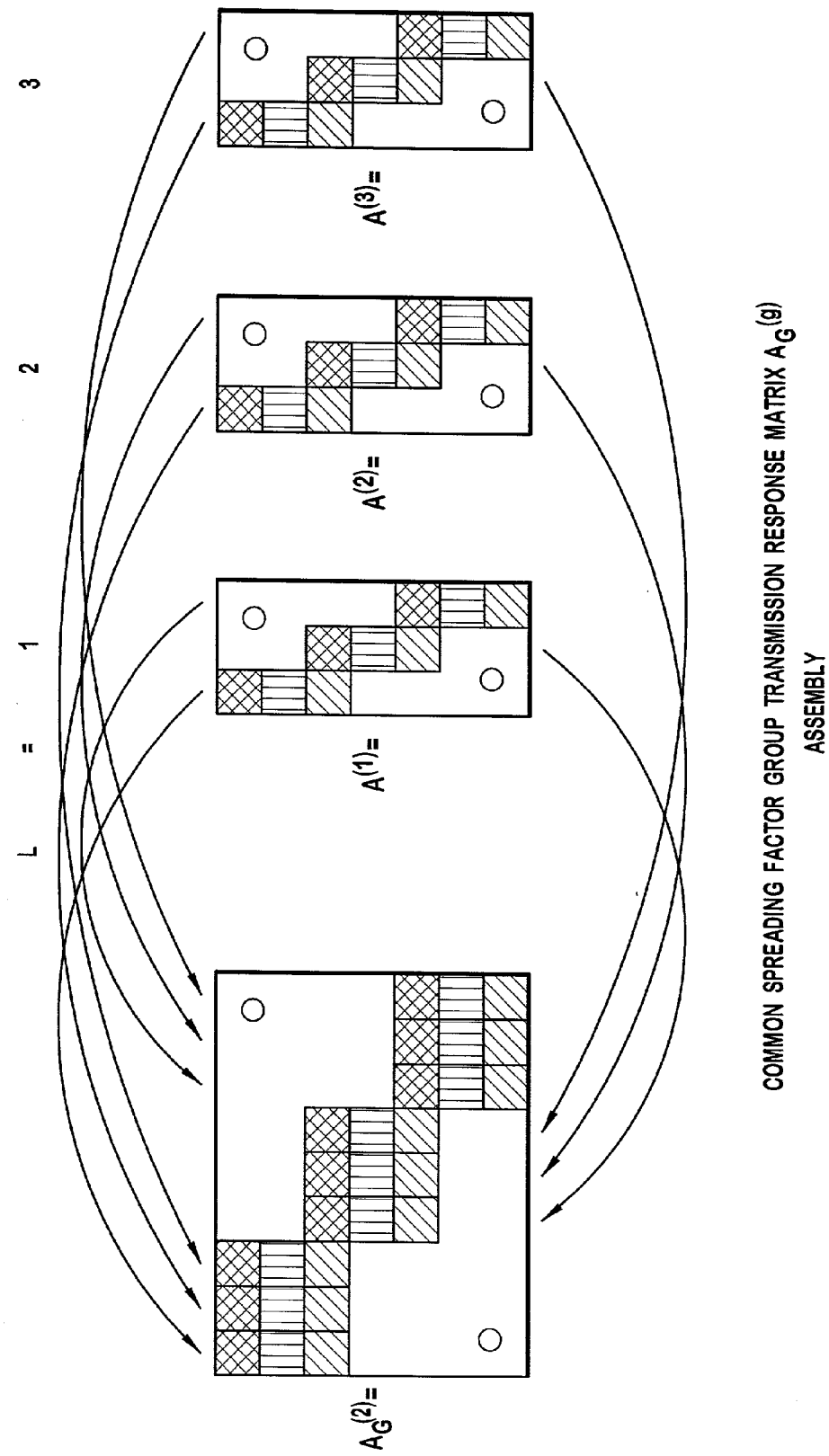
FIG. 11 depicts the steps for assembling a spreading factor group matrix $A_G^{(g)}$.

Within each spreading factor group, the columns of the associated system transmission response matrices $A^{(k)}$ are assembled into common spreading factor group transmission response matrices $A_G^{(g)}$, where g=1, 2, 3, ... G (step 205). As shown in FIG. 11, the method 199 copies the first column of the system transmission response matrix having index one to the first blank column of $A_G^{(g)}$; the first column of the system transmission response matrix having index two to the second blank column of $A_G^{(g)}$; continuing throughout the remaining system transmission response matrices in a respective spreading factor group g until all first columns are copied. The method 199 proceeds with copying the second columns, the third columns, etc., for each matrix $A^{(k)}$ in the respective spreading factor group $A_G^{(g)}$.

All matrices in a spreading factor group g have the same number of columns due to the same spreading factor. Therefore, the assembled spreading factor group transmission response matrices $A_G^{(g)}$ will have $L^{(g)}$ times the number of columns in one associated system transmission response matrices $A^{(k)}$.

To assemble a total system transmission response matrix A' accommodating variable spreading factors, the spreading factor group transmission response matrix $A_G^{(g)}$ having the lowest spreading factor is copied sequentially (step 207) into memory 33a, beginning with the first column, i.e., column one of $A_G^{(g)}$, to the first allocated column of A'. The spreading factor group transmission response matrix $A_G^{(g)}$ having the lowest spreading factor has the maximum number of columns. All other spreading factor group transmission response matrix columns will be inserted into this base matrix A'.

If the system spreading factors are even integer multiples of each other (step 209), the processor 33 assembles the total system transmission matrix A' (step 211) by considering the remaining spreading factor group transmission matrices $A^{G(g)}$ in any order (step 209). For each spreading factor group transmission matrix $A_G^{(g)}$, the processor 33 derives a column placement reference index m, $$m = n \cdot \frac{Q^{(g)}}{Q^{(1)}} - \frac{Q^{(g)}}{2 \cdot Q^{(1)}} \quad \text{Equation 13}$$

where $Q^{(g)}$ denotes the spreading factor associated with the spreading factor group transmission matrix $A_G^{(g)}$ under consideration, $Q^{(1)}$ denotes the lowest spreading factor among all groups and n is the column of the spreading factor group transmission response matrix $A_G^{(g)}$ under consideration where n=1, 2, 3, ... N (step 211).

To use the column placement index m, a reference location in A' is derived (step 215) using the total number of system transmission response matrices $L^{(1)}$ that constitute the spreading factor group matrix having the lowest spreading factor, $$m \times L^{(1)}. \quad \text{Equation 14}$$

The processor 33 derives a column set from the spreading factor group transmission response matrix $A_G^{(g)}$ under consideration (step 217) using the number of system transmission response matrices that belong to the spreading factor group currently under consideration, $$L^{(g)} \times (n-1)+1 \text{ through } L^{(g)} \times n. \quad \text{Equation 15}$$

Figure 12:
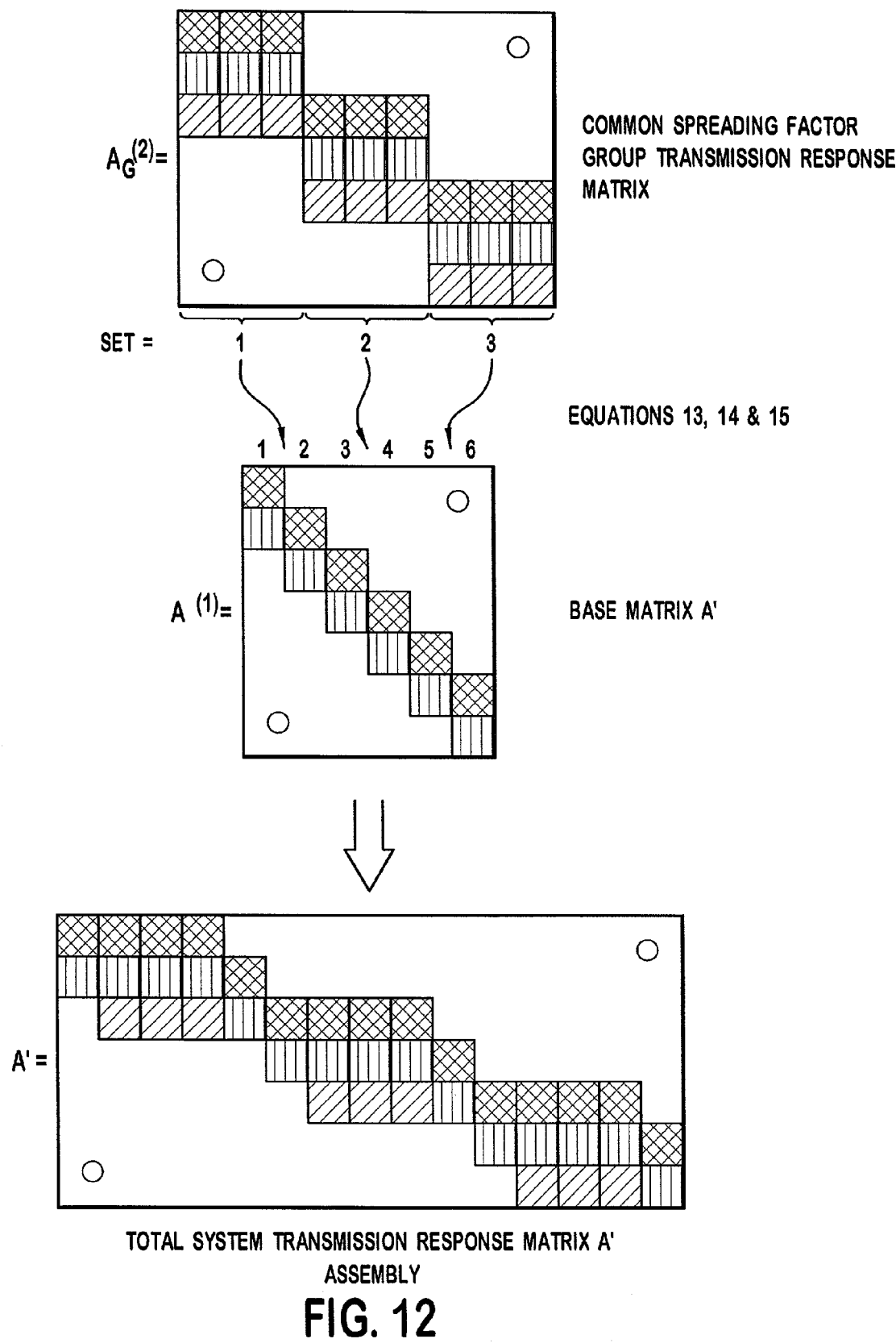
FIG. 12 depicts the steps for assembling an A' matrix in accordance with the present invention.

The processor 33 copies the column set defined by Equation 15 from $A_G^{(g)}$ and inserts it (step 219) into the base matrix A' after the column of $A_G^{(1)}$ which has the reference location defined by Equation 14 as shown in FIG. 12. The remaining columns of the spreading factor group matrix under consideration are copied and inserted into the base matrix A' similarly (step 221). After all columns from one spreading factor group matrix are placed, the processor 33 chooses the next spreading factor group matrix $A_G^{(g)}$ (step 223) and executes the above method. Equations 13, 14 and 15 allow the $i^{th}$ columns from the remaining spreading factor group transmission matrices $A_G^{(g)}$ to be placed in A' after an $m^{th}$ column that has similar support (step 225).

When the system spreading factors are not even integer multiples of each other, the right side expression of Equation 13 does not yield an integer. In this case, the processor 33 will round the result of Equation 13 to the nearest integer above or the nearest integer below the value (step 213). The rounding direction has negligible effect on overall system performance. The order in which the rest of the group system transmission matrices $A_G^{(g)}$ are considered may have some effect on the system performance. A priori knowledge of the spreading factors can be used to choose an optimum order in advance.

Using the arrangement techniques described above, and for the case when spreading factors are even integer multiples of each other, a matrix bandwidth B can be achieved which can be shown to be bounded as:

$$\left(\left\lceil\frac{W-1}{Q_{MAX}}\right\rceil \cdot \sum_{k=1}^{K}\frac{Q_{MAX}}{Q^{(k)}}\right) \leq B \leq$$

$$\left(\left(\left\lceil\frac{W-1}{Q_{MAX}}\right\rceil+1\right)\cdot \sum_{k=1}^{K}\frac{Q_{MAX}}{Q^{(k)}}\right)-1$$

Equation 16

Equation 16 predicts that the bandwidth of the total system transmission response matrix of Equation 11 will be between 3 and 6. An examination of Equation 12 reveals that the bandwidth after either arrangement method 99, 199 of the present invention 17 is 4.

The improvement the present invention 17 provides is further appreciated as the number of transmitted symbols increase. If a system transmitted 16,000 chips (800 symbols for a first user and 400 symbols for a second user), the bandwidth of the matrix $A^H A$ would be approximately 800. Using the arrangement method 99 to produce a total system response matrix A, the bandwidth of $A'^H A'$ remains four since bandwidth (Equation 16) is independent of the number of transmitted symbols. After all of the elements of objective matrix O are derived, the inverse 41 is performed. Since the complexity of inverting a matrix is proportional to the square of its bandwidth, the present invention 17 provides a reduction of computational complexity by a factor of approximately $(800/4)^2=200^2=40,000$.

The total system transmission response matrix A' provides the response characteristics to the matched-filter 25. Each column of the system response matrix A' is a vector which represents the response characteristics of a particular symbol. The received data vector r is input to the matched-filter 25 where it is matched with every response characteristic from the total system transmission response matrix A' to produce a matched filter output vector y. Each element of output vector y corresponds to a preliminary estimate of a particular symbol transmitted by a given user. The output vector y from the matched-filter 25 is loaded into a multiplier 43 with the inverted objective matrix 0. Both the matched-filter 25 output vector y and the inverted objective matrix O are multiplied yielding a user data vector d. The user data vector d contains all of the data transmitted from all users during the discreet time block. Since the objective matrix O and the matched filter 25 output are based on the total system response matrix A', the user data vector d must be de-scrambled. The de-scrambling process 149 is the inverse of the arrangement methods 99, 199.

A descrambler 45 re-arranges each element of the user data vector d based upon the column re-assignments performed while undergoing either arrangement method 99, 199. The elements of the data vector d are in the same order dictated by the total transmission response matrix A, 1, 9, 2, 3, 10, 4, 5, 11, 6, 7, 12, 8, transposed vertically. The descramber 45 allocates a memory space having the same dimension and places each vector element in sequential order, 1–12. After the user data vector d is descrambled 149, the user data is output 23 for further processing.

While the present invention has been described in terms of the preferred embodiment, other variations which are within the scope of the invention as outlined in the claims below will be apparent to those skilled in the art.

What is claimed is:

1. A method of detecting in a received CDMA communication (r) a plurality of data communications each corresponding with a specific user (k) comprising:
    (a) acquiring impulse response estimates for symbols within each data communication;
    (b) constructing a system transmission response matrix for each of the user data communications (k) from said impulse response estimates;
    (c) assembling a well-banded total system transmission response matrix from all of said user system transmission response matrices;
    (d) filtering said received CDMA communication (r) with said total system transmission response matrix yielding a matched filter output;
    (e) forming an objective matrix based upon said total system transmission response matrix;
    (f) inverting said objective matrix;
    (g) multiplying said matched filter output with said inverted objective matrix yielding estimated user data;
    (h) descrambling said estimated user data yielding user data corresponding to the plurality of data communications; and
    (I) repeating steps (a)–(h) for a next CDMA communication.

2. The method according to claim 1 wherein step (c) comprises:
    (c1) examining each of said system transmission response matrix columns for vector top ($o^{(k)}_{Tn}$) and bottom ($o^{(k)}_{Bn}$) offsets;
    (c2) assigning an index value ($n_i$) from 1 to n for each of said examined columns based upon said columns having a small top offset ($o^{(k)}_{Tn}$) with a large bottom offset ($o^{(k)}_{Bn}$) to said columns having a large top offset ($o^{(k)}_{Tn}$) with a small bottom offset ($o^{(k)}_{Bn}$) respectively; and
    (c3) arranging said examined total system transmission response matrix columns in accordance with said index values ($n_i$) according to increasing magnitude.

3. The method according to claim 2 wherein step (c2) comprises:
    (c2a) obtaining a difference between top offsets ($o^{(k)}_{Tn}$) and a difference between bottom offsets ($o^{(k)}_{Bn}$) for two columns if a first column has a larger top offset ($o^{(k)}_{Tn}$) and a larger bottom offset ($o^{(k)}_{Bn}$) than a second column;
    (c2b) comparing said top offset ($o^{(k)}_{Tn}$) difference and said bottom offset ($o^{(k)}_{Bn}$) difference yielding a greater top ($o^{(k)}_{Tn}$) or bottom offset ($o^{(k)}_{Bn}$) difference; and
    (c2c) if the top offset ($o^{(k)}_{Tn}$) difference is greater than the bottom offset ($o^{(k)}_{Bn}$) difference, assigning the lower index value for said column with a larger top offset ($o^{(k)}_{Tn}$) difference.

4. The method according to claim 3 wherein step (c2b) comprises:
    (c2b1) if the bottom offset ($o^{(k)}_{Bn}$) difference is greater than the top offset ($o^{(k)}_{Tn}$) difference, assigning the lower index value for said column with a larger bottom offset ($o^{(k)}_{Bn}$) difference.

5. The method according to claim 4 wherein forming said objective matrix as a decorrelator.

6. The method according to claim 4 wherein forming said objective matrix as a minimum mean square error detector.

7. The method according to claim 4 wherein forming said objective matrix as a zero-forcing block linear equalizer.

8. The method according to claim 1 wherein step (c) comprises:
   (c1) grouping said system transmission response matrices according to like spreading factors;
   (c2) assembling spreading factor group transmission response matrices from said groups of system transmission response matrices with like spreading factors; and
   (c3) forming a base total system response matrix from a common spreading factor group matrix having the lowest spreading factor.

9. The method according to claim 8 is further comprising:
   (c4) choosing one spreading factor group transmission response matrix for consideration from said remaining spreading factor group matrices;
   (c5) deriving a column placement reference for a first column of said chosen spreading factor group transmission response matrix;
   (c6) deriving a reference location in said base total system transmission response matrix;
   (c7) deriving a column set from said chosen spreading factor group transmission response matrix;
   (c8) inserting said column set after said column placement reference in said base total system response matrix;
   (c9) repeating steps (c5) through (c8) for each successive column of said spreading factor group transmission response matrix under consideration; and
   (c10) repeating steps (c5) through (c8) for remaining spreading factor group matrices.

10. The method according to claim 9 wherein step (c5) comprises:
    (c5a) assigning a column placement reference index m for said spreading factor group matrix under consideration using, $$m = n \cdot \frac{Q^{(g)}}{Q^{(1)}} - \frac{Q^{(g)}}{2 \cdot Q^{(1)}}$$

where $Q^{(g)}$ denotes the spreading factor associated with the spreading factor group transmission matrix under consideration, $Q^{(1)}$ denotes the lowest spreading factor among all groups and n is the column of the spreading factor group transmission response matrix under consideration where n=1, 2, 3, . . . .

11. The method according to claim 10 is further characterized by the step of rounding said column placement reference index m if not an integer.

12. The method according to claim 11 wherein step (c6) comprises:
    (c6a) assigning a reference location in said base total system transmission response matrix using, $$m \times L^{(1)}$$

where $L^{(1)}$ is total number of system transmission response matrices that constitute said spreading factor group matrix having the lowest spreading factor and m is said column placement reference index for said spreading factor group matrix under consideration.

13. The method according to claim 12 wherein step (c7) comprises:
    (c7a) assigning a column set from said spreading factor group transmission response matrix under consideration using, $$L^{(g)} \times (n-1) + 1 \text{ through } L^{(g)} \times n$$

where $L^{(g)}$ is said number of system transmission response matrices comprising said spreading factor group transmission matrix under consideration.

14. The method according to claim 13 wherein step (e) comprises forming said objective matrix as a decorrelator.

15. The method according to claim 13 wherein step (e) comprises forming said objective matrix as a minimum mean square error detector.

16. The method according to claim 13 wherein step (e) comprises forming said objective matrix as a zero-forcing block linear equalizer.

17. A method of detecting in a received CDMA communication (r) a plurality of user (k) data communications ($d^{(k)}$), each user data communication ($d^{(k)}$) having same or different spreading factors ($Q^{(k)}$), comprising:
    (a) acquiring impulse estimates corresponding with each symbol in each of the plurality of user data communications;
    (b) constructing a system transmission response matrix for each of the plurality of user data communications ($d^{(k)}$) from said respective impulse response estimates;
    (c) assembling a well-banded total system transmission response matrix from all of said system transmission response matrices;
    (d) filtering the received CDMA communication (r) with said arranged total system transmission response matrix yielding estimated data outputs;
    (e) forming an objective matrix from said arranged total system response matrix;
    (f) inverting said objective matrix;
    (g) multiplying said estimated outputs with said inverted objective matrix yielding user data corresponding to the plurality of user data communications; and
    (h) repeating steps (a)–(g) for a next CDMA communication.

18. The method according to claim 17 wherein step (c) comprises:
    (c1) examining each column of said system transmission response matrices for top ($o^{(k)}_{Tn}$) and bottom ($o^{(k)}_{Bn}$) offsets;
    (c2) assigning an index value ($n_i$) from 1 to n for each of said examined columns based upon said columns having a small top offset ($o^{(k)}_{Tn}$) with a large bottom offset ($o^{(k)}_{Bn}$) to said columns having a large top offset ($o^{(k)}_{Tn}$) with a small bottom offset ($o^{(k)}_{Bn}$) respectively; and
    (c3) arranging said examined total system transmission response matrix columns in accordance with said index values ($n_i$) according to increasing magnitude.

19. The method according to claim 18, wherein step (c2) comprises:
    (c2a) obtaining a difference between top offsets ($o^{(k)}_{Tn}$) and a difference between bottom offsets ($o^{(k)}_{Bn}$) for two columns if a first column has a larger top offset ($o^{(k)}_{Tn}$) and a larger bottom offset ($o^{(k)}_{Bn}$) than a second column;
    (c2b) comparing said top offset ($o^{(k)}_{Tn}$) difference and said bottom offset ($o^{(k)}_{Bn}$) difference yielding a greater top or bottom offset ($o^{(k)}_{Tn}$) difference; and (c2c) if the top offset ($o^{(k)}_{Tn}$) difference is greater than the bottom offset ($o^{(k)}_{Bn}$) difference, assigning the lower index value for said column with a larger top offset ($o^{(k)}_{Tn}$) difference.

20. The method according to claim 19 wherein step (c2b) is further characterized by the step of:
   (c2b1) if the bottom offset ($o^{(k)}_{Bn}$) difference is greater than the top offset ($o^{(k)}_{Tn}$) difference, assigning the lower index value for said column with a larger bottom offset ($o^{(k)}_{Bn}$) difference.

21. The method according to claim 20 wherein forming said objective matrix as a decorrelator.

22. The method according to claim 20 wherein forming said objective matrix as a minimum mean square error detector.

23. The method according to claim 20 wherein forming said objective matrix as a zero-forcing block linear equalizer.

24. The method according to claim 17 wherein step (c) comprises:
   (c1) grouping said system transmission response matrices according to like spreading factors (203);
   (c2) assembling spreading factor group transmission response matrices from said groups of system transmission response matrices with like spreading factors; and
   (c3) forming a base total system response matrix from a common spreading factor group matrix having the lowest spreading factor.

25. The method according to claim 24 comprising:
   (c4) choosing one spreading factor group transmission response matrix for consideration from said remaining spreading factor group matrices;
   (c5) deriving a column placement reference for a first column of said chosen spreading factor group transmission response matrix;
   (c6) deriving a reference location in said base total system transmission response matrix;
   (c7) deriving a column set from said chosen spreading factor group transmission response matrix;
   (c8) inserting said column set after said column placement reference in said base total system response matrix;
   (c9) repeating steps (c5) through (c8) for each successive column of said spreading factor group transmission response matrix under consideration; and
   (c10) repeating steps (c5) through (c8) for remaining spreading factor group matrices.

26. The method according to claim 25 wherein step (c5) comprises:
   (c5a) assigning a column placement reference index m (211) for said spreading factor group matrix under consideration using, $$m = n \cdot \frac{Q^{(g)}}{Q^{(1)}} - \frac{Q^{(g)}}{2 \cdot Q^{(1)}}$$

where $Q^{(g)}$ denotes the spreading factor associated with the spreading factor group transmission matrix under consideration, $Q^{(1)}$ denotes the lowest spreading factor among all groups and n is the column of the spreading factor group transmission response matrix under consideration where n=1, 2, 3, . . . .

27. The method according to claim 26 comprising rounding said column placement reference index m if not an integer.

28. The method according to claim 27 wherein step (c6) comprises:
   (c6a) assigning a reference location in said base total system transmission response matrix using, $$m \times L^{(1)}$$

where $L^{(1)}$ is total number of system transmission response matrices that constitute said spreading factor group matrix having the lowest spreading factor and m is said column placement reference index for said spreading factor group matrix under consideration.

29. The method according to claim 28 wherein step (c7) comprises:
   (c7a) assigning a column set from said spreading factor group transmission response matrix under consideration using, $$L^{(g)} \times (n-1) + 1 \text{ through } L^{(g)} \times n$$

where $L^{(g)}$ is said number of system transmission response matrices comprising said spreading factor group transmission matrix under consideration.

30. The method according to claim 29 wherein forming said objective matrix as a decorrelator.

31. The method according to claim 29 wherein forming said objective matrix as a minimum mean square error detector.

32. The method according to claim 29 wherein forming said objective matrix as a zero-forcing block linear equalizer.

33. A multiuser detector that detects in a received CDMA communication (r) a plurality of user data communications ($d^{(k)}$) comprising:
   means for acquiring impulse estimates corresponding with each symbol in each of the plurality of user data communications ($d^{(k)}$);
   means for assembling a system transmission response matrix for each of the plurality of user data communications ($d^{(k)}$) from said respective impulse response estimates;
   means for assembling a total system transmission response matrix from all of said system transmission response matrices yielding a well-banded matrix;
   means for filtering the received CDMA communication with said total system transmission response matrix yielding estimated data outputs;
   means for forming an objective matrix from said arranged total system response matrix;
   means for inverting said objective matrix; and
   means for multiplying said estimated outputs with said inverted objective matrix yielding user data ($d^{(k)}$) corresponding to the plurality of user data communications.

34. The multiuser detector according to claim 33 wherein said means for assembling an arranged total system transmission response matrix comprises:
   means for examining each of said total system transmission response matrix columns for top ($o^{(k)}_{Tn}$) and bottom ($o^{(k)}_{Bn}$) offsets;
   means for assigning an index value ($n_i$) from 1 to n for each of said examined columns based upon said columns having a small top offset ($o^{(k)}_{Tn}$) with a large bottom offset ($o^{(k)}_{Bn}$) to said columns having a large top offset ($o^{(k)}_{Tn}$) with a small bottom offset ($o^{(k)}_{Bn}$) respectively; and means for re-arranging said examined total system transmission response matrix columns in accordance with said index values ($n_i$) according to increasing magnitude.

35. The multiuser detector according to claim 34 wherein said means for assigning comprises:
means for obtaining a difference between top offsets ($o^{(k)}_{Tn}$) and a difference between bottom offsets ($o^{(k)}_{Bn}$) for two columns if a first column has a larger top offset ($o^{(k)}_{Tn}$) and a larger bottom offset ($o^{(k)}_{Bn}$) than a second column;
means for comparing said top offset ($o^{(k)}_{Tn}$) difference and said bottom offset ($o^{(k)}_{Bn}$) difference yielding a greater top ($o^{(k)}_{Tn}$) or bottom ($o^{(k)}_{Bn}$) offset difference; and
means for assigning a lower index value ($n_i$) for said column with a larger top offset ($o^{(k)}_{Tn}$) difference if the top offset ($o^{(k)}_{Tn}$) difference is greater than the bottom offset ($o^{(k)}_{Bn}$) difference.

36. The multiuser detector according to claim 35 wherein said means for comparing is further characterized by means for assigning a lower index value ($n_i$) for said column with a larger bottom offset ($o^{(k)}_{Bn}$) difference if the bottom offset ($o^{(k)}_{Bn}$) difference is greater than the top offset ($o^{(k)}_{Tn}$) difference.

37. The multiuser detector according to claim 36 wherein said objective matrix is a decorrelator.

38. The multiuser detector according to claim 36 wherein said objective matrix is a minimum mean square error detector.

39. The multiuser detector according to claim 36 wherein said objective matrix is a zero-forcing block linear equalizer.

40. The multiuser detector according to claim 33 wherein said means for assembling an arranged total system transmission response matrix comprises:
means for grouping said system transmission response matrices according to like spreading factors;
means for assembling spreading factor group transmission response matrices from said groups of system transmission response matrices with like spreading factors; and
means for forming a base total system response matrix from a common spreading factor group matrix having the lowest spreading factor.

41. The multiuser detector according to claim 40 comprises:
means for choosing one spreading factor group transmission response matrix for consideration from said remaining spreading factor group matrices;
means for deriving a column placement reference for a first column of said chosen spreading factor matrix;
means for deriving a reference location in said base total system transmission response matrix;
means for deriving a column set from said chosen spreading factor group transmission response matrix; and
means for inserting said column set after said column placement reference in said base total system response matrix.

42. The multiuser detector according to claim 41 wherein said means for deriving a column placement reference comprises:
means for assigning a column placement reference index m for said spreading factor group matrix under consideration using, $$m = n \cdot \frac{Q^{(g)}}{Q^{(1)}} - \frac{Q^{(g)}}{2 \cdot Q^{(1)}}$$

where $Q^{(g)}$ denotes the spreading factor associated with the spreading factor group transmission matrix under consideration, $Q^{(1)}$ denotes the lowest spreading factor among all groups and n is the column of the spreading factor group transmission response matrix under consideration where n=1, 2, 3, . . . .

43. The multiuser detector according to claim 42 wherein means for rounding said column placement reference index m if not an integer.

44. The multiuser detector according to claim 43 wherein said means for deriving a reference location comprises:
means for assigning a reference location in said base total system transmission response matrix using, $$m \times L^{(1)}$$

where $L^{(1)}$ is total number of system transmission response matrices that constitute said spreading factor group matrix having the lowest spreading factor and m is said column placement reference index for said spreading factor group matrix under consideration.

45. The multiuser detector according to claim 44 wherein said means for deriving a column set comprises:
means for assigning a column set from said spreading factor group transmission response matrix under consideration using, $$L^{(g)} \times (n-1) + 1 \text{ through } L^{(g)} \times n$$

where $L^{(g)}$ is said number of system transmission response matrices comprising said spreading factor group transmission matrix under consideration.

46. The multiuser detector according to claim 45 wherein said means for forming an objective matrix forms said objective matrix as a decorrelator.

47. The multiuser detector according to claim 45 wherein said means for forming an objective matrix forms said objective matrix as a minimum mean square error detector.

48. The multiuser detector according to claim 45 wherein said means for forming an objective matrix forms said objective matrix as a zero-forcing block linear equalizer.

* * * * *

UNITED STATES PATENT AND TRADEMARK OFFICE
CERTIFICATE OF CORRECTION

PATENT NO. : 7,136,369 B2
APPLICATION NO. : 10/100997
DATED : November 14, 2006
INVENTOR(S) : Reznik et al.

It is certified that error appears in the above-identified patent and that said Letters Patent is hereby corrected as shown below:

ON THE TITLE PAGE

At section (73), Assignee: page 1, left column, line 1, delete "InterDigital Rechnology Corporation" and insert therefor --InterDigital Technology Corporation--.

IN THE SPECIFICATION

At column 1, line 23, after the words "network or", delete "Ian" and insert therefor --lan--.

At column 3, line 11, before "= the" delete "$NC_C$" and insert therefor --$N_C$--.

At column 7, line 25, after the word "illustrate", delete "ate".

At column 7, line 26, after the word "response", insert --Matrix A--.

At column 10, line 27, after the word "offsets", delete "All".

At column 11, line 11, before the word "offsets", delete "$O(k)_{Bn}$" and insert therefor --$o_{Bn}^{(k)}$--.

At column 13, line 51, after the word "matrix", delete "0" and insert therefor --O--.

UNITED STATES PATENT AND TRADEMARK OFFICE
CERTIFICATE OF CORRECTION

PATENT NO. : 7,136,369 B2
APPLICATION NO. : 10/100997
DATED : November 14, 2006
INVENTOR(S) : Reznik et al.

It is certified that error appears in the above-identified patent and that said Letters Patent is hereby corrected as shown below:

IN THE CLAIMS

At claim 12, column 15, line 61, delete "$mxL^{(}1)$" and insert therefor --$mxL^{(1)}$--.

At claim 44, column 20, line 29, delete "$mxl^{(}1)$" and insert therefor --$mxL^{(1)}$--.

Signed and Sealed this

Fifteenth Day of April, 2008

JON W. DUDAS
*Director of the United States Patent and Trademark Office*